United States Patent [19]

Suzuki

[11] Patent Number: 5,045,621
[45] Date of Patent: Sep. 3, 1991

[54] METHOD FOR MANUFACTURING AN ORGANOPOLYSILOXANE IN WHICH A POLYMERIZABLE FUNCTIONAL GROUP IS PRESENT AT ONE END

[75] Inventor: Toshio Suzuki, East Sussex, England

[73] Assignee: Toray Silicone Company, Ltd., Tokyo, Japan

[21] Appl. No.: 412,684

[22] Filed: Sep. 26, 1989

[30] Foreign Application Priority Data

Sep. 30, 1988 [JP] Japan ................... 63-248440

[51] Int. Cl.$^5$ .......................... C08G 77/06
[52] U.S. Cl. ........................ 528/14; 528/37; 528/41; 528/43; 556/453; 556/460; 556/462
[58] Field of Search ............ 528/37, 14, 41, 43; 556/453, 460, 462

[56] References Cited

U.S. PATENT DOCUMENTS

| | | | |
|---|---|---|---|
| 4,075,169 | 2/1978 | Razzano .................. | 556/462 |
| 4,222,917 | 9/1980 | Razzano et al. .......... | 528/14 |
| 4,272,624 | 6/1981 | Razzano .................. | 528/14 |
| 4,874,881 | 10/1989 | Suzuki et al. ............. | 556/453 |
| 4,876,373 | 10/1989 | Okawa et al. ............. | 556/453 |

FOREIGN PATENT DOCUMENTS 59-78236  5/1984  Japan .

OTHER PUBLICATIONS

J. Saam et al., *Macromolecules,* vol. 1, No. 1, p. 1 (1970).
Polymer Communications, vol. 29, Aug. 1988, pp. 225–226, Guildford, GB; T. Suzuki et al.
Patent Abstracts of Japan, vol. 8, No. 184 (C-239) 1621, 23rd Aug. 1984.
Die Makromolekulare Chemie, vol. 189, No. 9, Sep. 1988, pp. 1997–2005, Basel, CH; Y. Gnanou et al.

*Primary Examiner*—Paul R. Michl
*Assistant Examiner*—Karen A. Hellender
*Attorney, Agent, or Firm*—George A. Grindahl

[57] ABSTRACT

A diorganopolysiloxane in which a polymerizable functional group is present at one (or both) molecule chain ends and in which an arbitrary group is present at the other end can be easily synthesized. The synthesis involves the opening of a cyclotrisiloxane using an alkali metal silanolate which bears the polymerizable functional group, followed by a capping reaction. The resulting diorganopolysiloxane can be used effectively as a feed material for manufacturing silicone rubbers, feed material for manufacturing novel grafted organopolysiloxanes, comonomer components for resins other than organopolysiloxanes or plastics, etc.

9 Claims, No Drawings

METHOD FOR MANUFACTURING AN ORGANOPOLYSILOXANE IN WHICH A POLYMERIZABLE FUNCTIONAL GROUP IS PRESENT AT ONE END

BACKGROUND OF THE INVENTION

The present invention concerns a method for manufacturing a diorganopolysiloxane in which a polymerizable functional group is present at one end. More specifically, the present invention concerns a method for manufacturing, by a nonequilibrium polymerization process, a diorganopolysiloxane in which a polymerizable functional group is present as at least one of the ends and in which an arbitrary group is present as the other end.

It is a well-established fact in the present technical field that a cyclic trisiloxane can be opened and polymerized using an alkali metal catalyst. There is a compound in which the objective polymer is synthesized by nonequilibrium polymerization in the presence of a lithium catalyst, a so-called "living polymerization". J. Saam et al. note, in Macromolecules, Vol. 3, No. 1, p. 1 (1970), that if hexamethylcyclotrisiloxane is opened using butyllithium and if the polymerization is terminated by a vinylchlorosilane treatment, a diorganopolysiloxane in which a vinyl group is present at one end is obtained. Japanese Kokai Patent No. Sho 59(1984)-78236 notes a method for manufacturing diorganopolysiloxane according to comparable procedures. Such functional group-introducing techniques are commonly referred to as the "terminating method".

If the aforementioned conventional techniques are implemented, however, an endcapping reaction is induced when a high-molecular-weight product has been produced; therefore, there is no guarantee for completing said functional group-introducing reaction. Since no functional group is present at the molecule chain end (i.e., molecule head) at the beginning of polymerization, only monofunctional diorganopolysiloxanes are obtained in these techniques.

The present inventors compiled exhaustive research to alleviate the aforementioned problems inherent in said terminating methods. Thus, the present invention has been completed. The foremost objective of the present invention is to provide a method for manufacturing an organopolysiloxane in which a polymerizable functional group is assuredly introduced to at least the molecule chain end at the beginning of polymerization, i.e., molecule head.

BRIEF SUMMARY OF THE INVENTION

The aforementioned objective of the present invention can be attained by a method for manufacturing an organopolysiloxane represented by the formula $$R^1R_2SiO(R_2SiO)_nB$$

in which a polymerizable functional group is present at one end, said method comprising polymerizing a cyclic trisiloxane represented by the formula

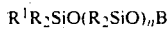

using an alkali metal salt of an organosilane or organopolysiloxane represented by the formula

as a polymerization initiator in the presence or absence of an organosilane or organopolysiloxane represented by the formula

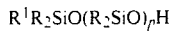

as a molecular weight control agent and in which the reaction is subsequently terminated; wherein $R^1$ is a monovalent organic group which contains an acrylic group, methacrylic group, or vinylphenyl group; the individual R groups, which may be identical to or different from one another, are monovalent hydrocarbon groups; A is an alkali metal; m and p are 0 or an integer of 1 or above; B is a monovalent group selected from among a hydrogen atom and endcapping groups; n is a number which is equal to, or greater than, the value of m+3; and the polymerization initiator/molecular weight control agent molar ratio has a value of from 100/0 to 0.1/100.

DETAILED DESCRIPTION OF THE INVENTION

The organosilane or organopolysiloxane alkali metal silanolate salt which is used as a polymerization initiator has the formula $R^1R_2SiO(R_2SiO)_mA$ and is characterized by the presence of an organic group ($R^1$) which has a polymerizable functional group which is bonded with a silicon atom at one molecule chain end and the presence of an alkali metal (A) which has substituted the hydrogen atom of the hydroxyl group which is bonded with the silicon atom of the other molecule chain end, which is the same silicon atom in an organosilanol.

There are various conventionally known methods for manufacturing said organosilane or organopolysiloxane alkali metal salt. In a representative manufacturing method a corresponding polymerizable functional group-containing monochlorosilane or monochloropolysiloxane is carefully hydrolyzed in a dilute basic aqueous solution and the resulting organosilane or organopolysiloxane which has both a polymerizable functional group and a silanol group is reacted with an alkali metal compound. As a result, the objective compound is synthesized.

Concrete examples of alkali metals corresponding to A include lithium, sodium, potassium, etc. As when ordinary organopolysiloxanes undergo living polymerization, lithium is the most desirable. When a silanol group is converted into a lithium salt, said silanol group is usually reacted with an alkyllithium. As far as the present invention is concerned, the most favorable results are obtained if n-butyllithium is used.

An ordinary polymerizable functional group tends to be polymerized in the presence of an alkali metal catalyst. Since an organosilane or organopolysiloxane characterized by a special structure is used as the feed material of the present invention, the polymerizable functional group remains stable throughout the entire organopolysiloxane-manufacturing process.

The polymerizable functional group-containing organic group $R^1$ is a monovalent organic group which contains an acrylic group, methacrylic group, or vinylphenyl group. There are no special restrictions on the structure of said group. Said group may be bonded with a silicon atom either directly or via an appropriate linking group. It is more desirable that said group be bonded via a silicon-carbon bond than a silicon-oxygen bond with respect to the hydrolysis stability.

Concrete examples of groups corresponding to $R^1$ include acryloxymethyl, methacryloxymethyl, 3-acryloxypropyl, 3-methacryloxypropyl, 4-acryloxybutyl, 4-methacryloxybutyl, vinylphenyl, vinylbenzyl, vinylphenethyl, etc. The 3-acryloxypropyl group or 3-methacryloxypropyl group is the most desirable with respect to the feed material accessibility.

The individual R groups, which may be identical to or different from one another, are monovalent hydrocarbon groups. It is desirable that most of said groups be methyl groups with respect to the manufacturing efficiency. Concrete examples of R groups other than the methyl group include alkyl groups (e.g., ethyl, propyl, butyl, pentyl, hexyl, etc.), aryl groups (e.g., phenyl, toluyl, xylyl, etc.), aralkyl groups (e.g., benzyl, phenethyl, etc.), alkenyl groups (e.g., vinyl, allyl, butenyl, pentenyl, hexenyl, etc.), and halogenated monovalent hydrocarbon groups.

m is 0 or an integer of 1 or above. Under normal circumstances, it is desirable that said value be 0 with respect to the synthesizing efficiency and purifying efficiency. If the molecular weight of the segment corresponding to $R^1$ is small, the stability of the silanol is questionable. Thus, a quick dehydrating/condensing reaction may be induced. Then, it is desirable that m be a number of 1 to 3.

The cyclic trisiloxane used in the present invention is a conventionally known material having the formula

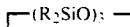

and is used as a living polymerization monomer. As in the aforementioned case, substituent R, which is bonded with silicon, is a monovalent hydrocarbon group. It is desirable that R be a methyl group or phenyl group with respect to the accessibility.

The optimum polymerization conditions depend on the types of cyclic trisiloxane monomers used. For example, when hexamethylcyclotrisiloxane is polymerized, it is desirable that the reaction be induced in a solvent at 0° to 30° C. for 1 to 50 hours.

There are no special restrictions on the types of solvents used in the aforementioned process as long as they are aprotic and are capable of efficiently dissolving the feed material and product polymer. Concrete examples of especially desirable solvents include aromatic compounds (e.g., benzene, toluene, xylene, etc.), aliphatic compounds (e.g., hexane, heptane, etc.), ethers (e.g., tetrahydrofuran, diethyl ether, etc.), ketones (e.g., acetone, methyl ethyl ketone, etc.), esters (e.g., ethyl acetate, butyl acetate, etc.), dimethylformamide, hexamethylphosphoric triamide, dimethyl sulfoxide, etc. In some cases, more favorable results are obtained if two or more types of solvents are used together. For example, when a low-polarity solvent (e.g., toluene, etc.) is used, it is desirable to use a high-polarity solvent (e.g., dimethylformamide, dimethyl sulfoxide, hexamethylphosphoric triamide, etc.) to accelerate the reaction.

As far as other polymerization conditions are concerned, it is desirable that the reaction temperature and time be carefully selected so that a redistributing reaction will not transpire. In other words, if an equilibrium reaction associated with redistribution is induced instead of a non-equilibrium reaction, it is impossible to sustain a polymerizable functional group at only one end. In other words, if an equilibrium reaction is induced, a polymer in which polymerizable functional groups are present at both ends and a polymer in which no polymerizable functional group is present at either end are simultaneously produced as by-products.

When the polymerization is induced, the weight loss of the feed monomer is monitored by gas chromatographic analysis, etc.; it is desirable that the reaction be terminated by neutralization when the reactivity has reached a certain level. The optimum reactivity (i.e., percentage) at which the reaction is terminated depends on the types of feed materials and objective polymers. Under normal circumstances, however, it is desirable that the reaction be terminated when the reactivity has reached 60 to 100%, preferably 70 to 90%.

It is necessary that the solvent and feed monomer be water-free as much as possible prior to the reaction. If water is present, the molecular weight of the resulting organopolysiloxane inevitably decreases; in some cases, it is impossible to synthesize an organopolysiloxane in which a polymerizable functional group is present at one end. When the solvent and monomer are dried, various methods (e.g., distillation, heating, dry gas permeation, activated alumina, silica gel, or zeolite adsorption, dehydration by alkali metals or other compounds, etc.) can be used.

When the manufacturing method of the present invention is implemented, the molecular weight of the resulting organopolysiloxane is dependent on the ratio between the polymerization initiator and the consumed cyclic trisiloxane. Since the hydrogen atom of a silanol group is exchanged with an alkali metal at an extremely high rate a silanol group-containing organosilane or organopolysiloxane, which is a feed material for the alkali metal silanolate (i.e., polymerization initiator) may be safely added as a molecular weight control agent. This molecular weight control agent has the formula $R^1R_2SiO(R_2SiO)_pH$ and can be manufactured during the preparation of the polymerization initiator by reacting a molar amount of an alkali metal compound which is smaller than the molar amount of the silanol group-containing compound so that a mixture consisting of a polymerization initiator and unreacted silanol group-containing organosilane or organopolysiloxane will be obtained. An additional organosilane or organopolysiloxane which has an end polymerizable functional group and a silanol group at the other end and which is different from the feed material of the polymerization initiator can also be added. The degree of polymerization p of said molecular weight control agent may be identical to or different from the m value. Especially desirable results are obtained if the value of p is 0, as in the case of m.

It is necessary that the quantity of the alkali metal silanolate be large enough for inducing a cyclizing reaction. More specifically, it is desirable that the polymerization initiator/molecular weight control agent molar ratio be 100/0 to 0.1/100. In particular, if said ratio is 0.5/99.5 to 50/50, an excellent polymerization rate is attained, and the production efficiency is improved. In such a case, expensive catalysts can be conserved.

As neutralizing agents which are used for terminating the reaction, compounds which are capable of forming stable alkali metal salts by alkali metal silanolates can be used. Concrete examples of such compounds include water-containing carbon dioxide, mineral acids (e.g., hydrochloric acid, sulfuric acid, etc.), carboxylic acids (e.g., acetic acid, propionic acid, acrylic acid, etc.), and chlorosilanes (e.g., trimethylchlorosilane, dimethylchlorosilane, dimethylphenylchlorosilane, dimethylvinylchlorosilane, etc.). If the reaction is terminated using water-containing carbon dioxide, mineral acid, or carboxylic acid, the terminating-end of the resulting polymer is characterized by the presence of silanol. If the reaction is terminated by chlorosilane, a silyl group which has been obtained by removing chlorine from said silane is present as a endcapping group. When attempts are made to introduce silanol to the molecule chain end opposite the polymerizable functional group-containing end, it is desirable that the reaction be terminated using an acid. When a functional group which is connected to the silicon atom is introduced, on the other hand, it is desirable that the reaction be terminated using a chlorosilane which has said functional group. For example, when a polymerization initiator which has a 3-methacryloxypropyl group as $R^1$ is used, an organopolysiloxane in which identical polymerizable functional groups are present at both molecule chain ends is obtained if the end is capped using a chlorosilane which has a 3-methacryloxypropyl group. If a chlorosilane is added to a silanol group-terminated organopolysiloxane which has been obtained by terminating the reaction using an acid, functional groups can be introduced by a dehydrochlorinating reaction. Then, it is desirable that hydrochloric acid scavengers (e.g., amines, etc.) be added. If the silanol group-terminated organopolysiloxane is reacted with silazanes, aminosilanes, silylamides, alkoxysilanes, etc., various functional groups can be introduced.

The n value of the resulting organopolysiloxane is at least 3. A polymerizable functional group is present at one or both ends. The opposite end B has a silyl group which has been bonded with an alkyl group, aryl group, alkenyl group, alkynyl group, hydrogen atom, polymerizable functional group, etc. Graft copolymers with respect to other polymers can be manufactured using said polymerizable functional group or the functional group at the opposite end.

In the paragraphs to follow, the contents of the present invention will be explained in further detail with reference to application examples. In subsequent reference examples, the expression "percent" or "%" signifies "wt %" unless otherwise indicated. Me in chemical formulas signifies a methyl group.

APPLICATION EXAMPLE 1

After 60 mL of water, 60 ml of diethyl ether, and 7 g (83 mmol) of sodium bicarbonate had been placed into a four-necked flask, the temperature was lowered to 0° C. Next, 15 g (68 mmol) of 3-methacryloxypropyldimethylchlorosilane were added dropwise into the resulting mixture, which was being agitated, via a dropping funnel. After the reaction had been completed, the ether layer was separated and then washed with water once. After the ether had subsequently been distilled and removed at room temperature and reduced pressure, 3-methacryloxypropyldimethylsilanol (hereafter, "MPOH") was obtained. The structure of said compound was verified by gas chromatographic analysis (GLC) and nuclear magnetic resonance analysis (NMR).

After 10.3 g (50.9 mmol) of MPOH had been placed into a separate four-necked flask, 4.4 mmol of n-butyllithium (hexane solution) were placed into said flask with shaking in an atmosphere of dry nitrogen. Immediately thereafter 76 g (171 mmol) of a toluene solution containing 50% of hexamethylcyclotrisiloxane and 0.76 g of dimethyl sulfoxide were added. When the contents were reacted at room temperature for 10 h, the hexamethylcyclotrisiloxane conversion reached 80% (according to GLC). At this point, the reaction was terminated by adding 0.5 g (3.3 mmol) of acetic acid. After the resulting reaction mixture had subsequently been filtered, the solvent and unreacted feed materials were distilled and removed at reduced pressure. Thus, the objective polymer was obtained.

Gel permeation chromatographic analysis (GPC), NMR, and infrared spectral analysis (IR) revealed that the resulting polymer was characterized by the following structure.

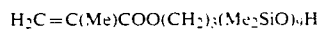

$H_2C=C(Me)COO(CH_2)_3(Me_2SiO)_nH$

APPLICATION EXAMPLE 2

After 10.3 g (50.9 mmol) of an MPOH identical to that used in Application Example 1 had been placed into a four-necked flask, 15 mmol of n-butyllithium (hexane solution) were placed into said flask with shaking in an atmosphere of dry nitrogen. Immediately thereafter 760 g (1.71 mol) of a tetrahydrofuran solution containing 50% of hexamethylcyclotrisiloxane were added. When the contents were reacted at room temperature for 2.5 h, the hexamethylcyclotrisiloxane conversion reached 78% (according to GLC). At this point, the reaction was terminated by adding 8.1 g (80 mmol) of triethylamine and 9.7 g (80 mmol) of dimethylvinylchlorosilane. After the resulting reaction mixture had subsequently been filtered, the solvent and unreacted feed materials were distilled and removed at reduced pressure. Thus, the objective polymer was obtained.

Gel permeation chromatographic analysis (GPC), NMR, and infrared spectral analysis (IR) revealed that the resulting polymer was characterized by the following structure.

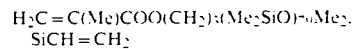

$H_2C=C(Me)COO(CH_2)_3(Me_2SiO)_nMe_2.$
$SiCH=CH_2$

EFFECTS OF THE INVENTION

If the method of the present invention for manufacturing an organopolysiloxane is implemented, a diorganopolysiloxane in which a polymerizable functional group is present at one (or both) molecule chain ends and in which an arbitrary group is present at the other end can be easily synthesized. The resulting diorganopolysiloxane can be used effectively as a feed material for manufacturing silicone rubbers, feed material for manufacturing novel grafted organopolysiloxanes, comonomer components for resins other than organopolysiloxanes or plastics, etc. Thus, it is an extremely useful compound in the technical field of chemistry.

That which is claimed is:

1. A method for manufacturing an organopolysiloxane represented by the formula

$R^1R_2SiO(R_2SiO)_nB$ in which a polymerizable functional group is present at one end, said method comprising polymerizing a cyclic trisiloxane represented by the formula $$[(R_2SiO)_3]$$

using an alkali metal salt of an organosilane or organopolysiloxane represented by the formula $$R^1R_2SiO(R_2SiO)_mA$$

as a polymerization initiator in the presence or absence of an organosilane or organopolysiloxane represented by the formula $$R^1R_2SiO(R_2SiO)_pH$$

as a molecular weight control agent and in which the reaction is subsequently terminated; wherein $R^1$ is a monovalent organic group which contains an acrylic group, methacrylic group, or vinylphenyl group; the individual R groups, which may be identical to or different from one another, are monovalent hydrocarbon groups; A is an alkali metal; m and p are 0 or an integer of 1 or above; B is a monovalent group selected from the group consisting of a hydrogen atom and endcapping groups; n is a number which is equal to, or greater than, the value of m+3; and the polymerization initiator/molecular weight control agent molar ratio has a value of from 100/0 to 0.1/100.

2. A method according to claim 1 in which $R^1$ is a 3-methacryloxypropyl group.

3. A method according to claim 1 in which R is a methyl group.

4. A method according to claim 1 in which m is 0.

5. A method according to claim 1 in which said alkali metal is lithium.

6. A method according to claim 1 in which the molecular weight control agent is manufactured during the preparation of the polymerization initiator by reacting a molar amount of an alkali metal compound selected from the group consisting of alkali metals and alkyllithium which is smaller than the molar amount of the silanol group-containing compound having the formula $R^1R_2SiO(R_2SiO)_pH$.

7. A method according to claim 1 in which there is present an aprotic solvent.

8. A method according to claim 1 in which the reaction is terminated using acid and the terminating-end of the resulting polymer is characterized by the presence of silanol.

9. A method according to claim 1 in which the reaction is terminated using a chlorosilane and the terminating-end of the resulting polymer is characterized by the presence of a silyl group which has been obtained by removing chlorine from said chlorosilane.

* * * * *